US012594560B2

(12) United States Patent
Aagaard

(10) Patent No.: US 12,594,560 B2
(45) Date of Patent: Apr. 7, 2026

(54) SOLID-BOWL SCREW CENTRIFUGE

(71) Applicant: GEA MECHANICAL EQUIPMENT GMBH, Oelde (DE)

(72) Inventor: Poul-Erik Aagaard, Sporup (DK)

(73) Assignee: GEA Mechanical Equipment GmbH, Oelde (DE)

(*) Notice: Subject to any disclaimer, the term of this patent is extended or adjusted under 35 U.S.C. 154(b) by 1045 days.

(21) Appl. No.: 17/764,663

(22) PCT Filed: Sep. 30, 2020

(86) PCT No.: PCT/EP2020/077376
§ 371 (c)(1),
(2) Date: Mar. 29, 2022

(87) PCT Pub. No.: WO2021/064025
PCT Pub. Date: Apr. 8, 2021

(65) Prior Publication Data

US 2022/0347698 A1 Nov. 3, 2022

(30) Foreign Application Priority Data

Sep. 30, 2019 (DE) ..................... 10 2019 126 325.5

(51) Int. Cl.
*B04B 1/20* (2006.01)
*B04B 1/08* (2006.01)

(52) U.S. Cl.
CPC .................. *B04B 1/20* (2013.01); *B04B 1/08* (2013.01); *B04B 2001/2091* (2013.01)

(58) Field of Classification Search
CPC ...... B04B 1/20; B04B 1/08; B04B 2001/2091
(Continued)

(56) References Cited

U.S. PATENT DOCUMENTS 4,323,190 A * 4/1982 Bessette .................... B04B 1/20 494/60
4,334,647 A 6/1982 Taylor
(Continued)

FOREIGN PATENT DOCUMENTS

DE 2257513 A1 5/1974
DE 3120289 A1 4/1982
(Continued)

OTHER PUBLICATIONS

International Search Report mailed Dec. 14, 2020 in related/corresponding International Application No. PCT/EP2020/077376.
(Continued)

*Primary Examiner* — Claire X Wang
*Assistant Examiner* — Shuyi S. Liu
(74) *Attorney, Agent, or Firm* — PATENT PORTFOLIO BUILDERS PLLC

(57) ABSTRACT

A solid-bowl screw centrifuge has a rotatable drum with cylindrical and conical portions. At least one solid discharge is arranged in the conical portion of the drum. A screw is arranged in the drum and can rotate at a differential speed in relation to the rotatable drum. At least two drum bearings are used for mounting the drum in a housing and at least one screw bearing is used for mounting the screw in the drum. The drum and the screw mounting are designed in the region of the conical portion or the dry zone in such a way that solid matter is transported with the aid of the screw up to a solid-discharge drum cover, which forms the termination of the conical portion in the axial direction of the drum, in order to leave the drum through multiple openings in the solid-discharge drum cover.

17 Claims, 6 Drawing Sheets

Figure 1:
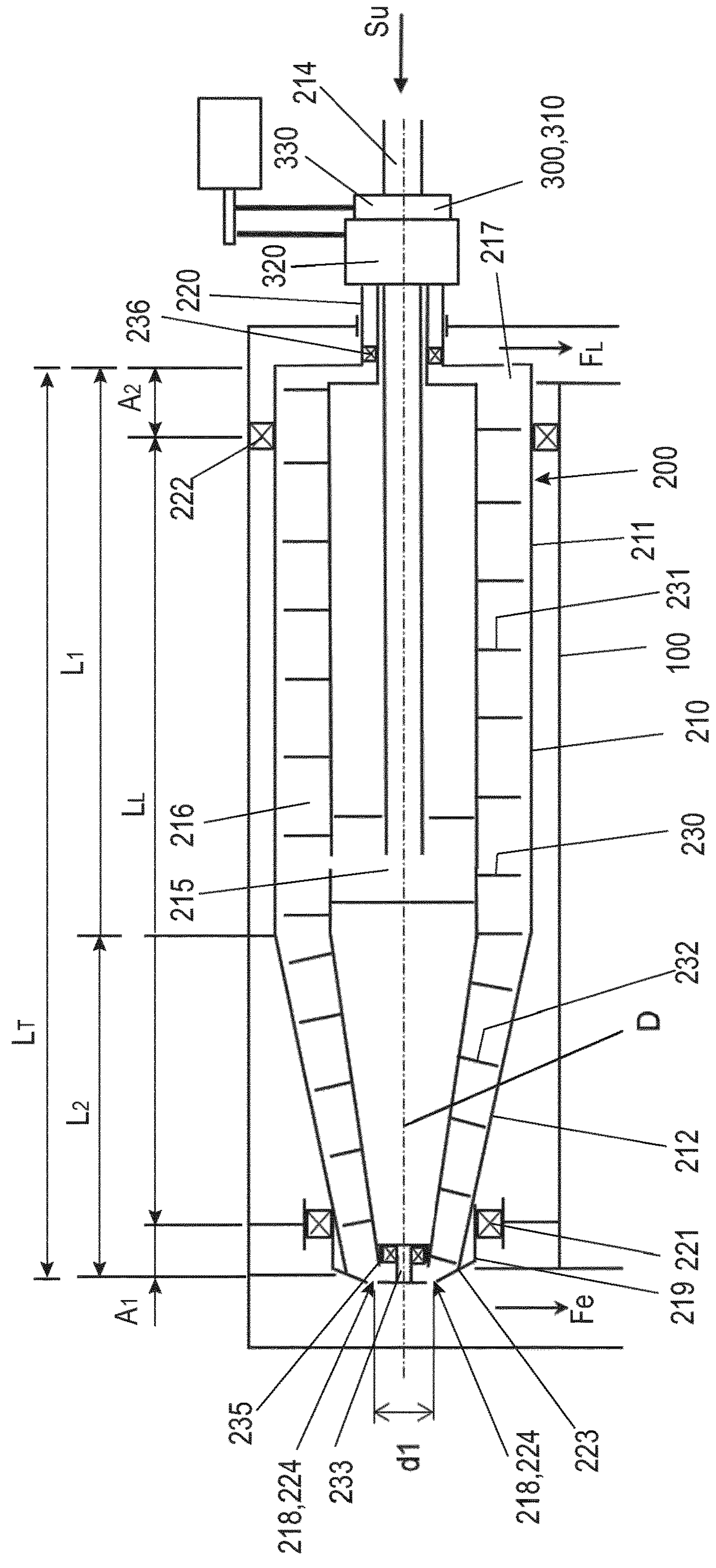

(58) Field of Classification Search
USPC .................................. 494/56, 57, 58, 59, 66
See application file for complete search history.

(56) References Cited

U.S. PATENT DOCUMENTS

| | | | | |
|---|---|---|---|---|
| 6,986,733 | B2 | 1/2006 | Beyer et al. | |
| 8,444,541 | B2 * | 5/2013 | Horbach | B04B 1/20 494/56 |
| 2004/0185999 | A1 * | 9/2004 | Beyer | B04B 7/02 494/60 |

FOREIGN PATENT DOCUMENTS

| | | | | |
|---|---|---|---|---|
| DE | 3147404 | A1 | 11/1982 | |
| DE | 102018119279 | A1 | 2/2020 | |
| EP | 0490270 | A2 * | 6/1992 | B04B 1/2016 |
| EP | 2422882 | A1 * | 2/2012 | B04B 1/2008 |
| JP | 2005254190 | A | 9/2005 | |
| KR | 101422567 | B1 | 7/2014 | |
| WO | 03031073 | A1 | 4/2003 | |
| WO | 2018202358 | A1 | 11/2018 | |

OTHER PUBLICATIONS

Search Report created Aug. 24, 2020 in related/corresponding DE Application No. 10 2019 126 325.5.
Written Opinion mailed Dec. 14, 2020 in related/corresponding International Application No. PCT/EP2020/077376.

* cited by examiner

SOLID-BOWL SCREW CENTRIFUGE

BACKGROUND AND SUMMARY OF THE INVENTION

Exemplary embodiments of the invention relate to a solid-bowl screw centrifuge.

A solid phase can be separated from a suspension using a solid-bowl screw centrifuge (also known as a decanter). Optionally, the suspension thus clarified from solids can be separated into different liquid phases in a design with two liquid outlets. Solid-bowl screw centrifuges are very well suited for processing comparatively high solids concentrations in the feed stream, are comparatively robust, achieve a very good separation result and cause good drying of the solids.

Known solid-bowl screw centrifuges having a frame which is not rotatable or does not rotate during operation comprise a rotatable or rotating rotor which in turn has a drum and a screw which can rotate at a speed different from that of the drum. For the discharge of the solids, substantially radially aligned solid-discharge openings are provided in a conically shaped portion of the drum.

If the energy loss caused when the solids are discharged from the drum of the solid-bowl screw centrifuge is to be as small as possible, the radius on which the solid-discharge openings are located in the drying zone or in the conical portion of the bowl must be as small as possible.

If a solid-bowl screw centrifuge is to be operated in such a way that the so-called pond depth, which results from the difference between the internal diameter of the drum and the diameter of the liquid weir to which the suspension in the bowl reaches inwards, is as large as possible, this requires the solids to be discharged as close as possible to the axis of rotation. Also for this purpose, the radius on which the solid-discharge openings are located in the drying zone or in the conical portion of the drum must be as small as possible. For the technological background, reference is made in this respect to KR 101 422 567 B1.

In common prior-art solid-bowl screw centrifuges—as shown, for example, in DE 10 2018119 279 A1—the outlet opening for the solids is usually located in a substantially radial orientation in the outer shell of the drum at the end of the drying zone or conical portion of the drum. One reason for this is that the distance between the drum bearings determines the critical speed of the rotating system and the drum length is limited by this. In order to use the full length between the bearings for the separation and drying zone of the drum, the solids are usually ejected radially through the conical wall of the drum.

Screw-in solids discharge sleeves are known from WO 2018/202358 A1, wherein both the pond depth and the discharge diameter can be changed by the screw-in depth of the discharge sleeves.

A disadvantage of the technical teaching of WO 2018/202358 A1 is that no discharge diameter smaller than the smallest diameter of the conical portion of the drum can be set.

Exemplary embodiments are directed to reducing these problems.

According to the characterizing feature, the drum is configured in the region of the conical portion or drying zone such that solid matter Fe is transported by means of the screw to a solid-discharge drum cover, which forms the termination of the conical portion in the axial direction of the drum, in order to leave the drum through a plurality of axially or substantially axially aligned openings in the solid-discharge drum cover.

In this case and as a result, the discharge diameter of the solids discharge can advantageously be designed smaller than the smallest inner diameter of the conical portion of the drum. In this case or for this purpose, the effective openings for solids discharge thus lie in the solid-discharge drum cover within, preferably completely within, the smallest inner diameter of the conical portion of the drum. In this way, the energy loss caused by the ejection of the solids from the drum of solid-bowl screw centrifuges can be kept very low. Furthermore, a solid-bowl screw centrifuge according to the invention can advantageously be operated with the greatest possible pond depth.

The axially or substantially axially extending openings in the conical portion of the solid-discharge drum cover for solids discharge are oriented at a greater angle than the cone angle of the inner conical portion of the drum and/or the outer conical portion of the screw. Preferably, the angle is even 90° to the axis of rotation or more than 45°, in particular more than 60°, to the axis of rotation of the drum. In this context, it may preferably be provided that the one or more openings for solids discharge are formed in the conical portion of the solid-discharge drum cover, in which case it may further preferably be provided that the conical portion of the solid-discharge drum cover has a cone angle of more than 45°, in particular more than 60°, with respect to the axis of rotation.

It may be further provided that in the conical portion of the solid-discharge drum cover, the openings are arranged on a pitch circle with a diameter d1 smaller than the smallest diameter of the inner conical portion of the drum.

In a preferred embodiment variant of the invention, the openings in the solid-discharge drum cover are preferably each (partially) covered by a replaceable cover element, in particular a replaceable cover plate, in which openings can be formed in aperture-like manner. A plurality of cover elements, in particular cover plates with differently positioned and/or dimensioned openings, can create a simple and thus advantageous adjustment option for the solid-discharge openings. This is because the openings of the cover element used in each case, in particular the cover plate, define the "effective" openings through which the solids can leave the drum at the drum cover.

In this context, according to one embodiment, the aperture-like openings can be arranged in a circular shape on a pitch circle with a diameter d1 and have an opening diameter d2.

It can then be further advantageously provided that both the diameter d1 and the diameter d2 can be changed by replacing the respective cover plate. For this purpose, cover plates with different opening arrangements must be provided. In this way, the solids outlet can be easily changed over a wide range and thus be individually and easily adapted to the specific conditions of the respective application of the solid-bowl screw centrifuge. The cover plate can advantageously be arranged on the outside of the drum cover, where it can be easily changed. However, it can also be arranged on the inside.

According to another design of the invention, it may be provided that a sleeve or disc is rotatably mounted in each of the openings of the solid-discharge drum cover. It may be further advantageously provided that each sleeve or disc has an opening that is preferably eccentrically formed in the sleeve/disc. This provides a simple and thus advantageous adjustment option for the solids discharge. It is also advantageous if and that in this way, by rotating the respective sleeve/disc about its center point, which lies on a diameter d3, the diameter on which the respective opening lies can be changed. In this way, the radius on which the center point of the opening of the solids outlet lies can be easily changed in a wide range and thus be individually and easily adapted to the specific conditions of the respective application of the solid-bowl screw centrifuge.

In a preferred embodiment variant of the invention, the solid-discharge drum cover has a cylindrical portion which, according to an additional further development, can be attached to a drum shaft portion. This results in an advantageously simple attachment of the solid-discharge drum cover to the drum, which also allows retrofitting of the solid-discharge drum cover to prior art solid-bowl screw centrifuges without major modifications.

According to one variant, it may be further advantageously provided that a screw shaft portion is formed in the conical portion of the solid-discharge drum cover or a journal that can be coupled to such a screw shaft portion. In particular, the integrated screw shaft portion of the solid-discharge drum cover results in an advantageously simple assembly of the screw shaft bearing, which also allows retrofitting of the solid-discharge drum cover to prior art solid-bowl screw centrifuges without major modifications. If the screw shaft portion is integrally formed on the conical portion of the solid-discharge drum cover, the result is a solid-discharge drum cover that is advantageously simple to manufacture, can be produced by forging or casting, for example, and can be completely machined in a single clamping operation.

According to an optional further development, the cylindrical portion of the bowl has a length $L_1$ and the conical portion of the bowl has a length $L_2$, wherein $L_1$ and $L_2$ added together is the length $L_T$ of the drum, and the drum bearings for supporting the drum in the housing are spaced apart by a distance $L_L$, wherein the distance $L_L$ of the drum bearings from each other is less than the length $L_T$ of the drum. This advantageous arrangement of the drum bearings allows the critical speed of the drum to be in a higher speed range than in prior art solid-bowl screw centrifuges. As a result, the separation performance of the solid-bowl screw centrifuge can be advantageously increased without having to increase the volume of the drum.

BRIEF DESCRIPTION OF THE DRAWING FIGURES

Figure 2A:
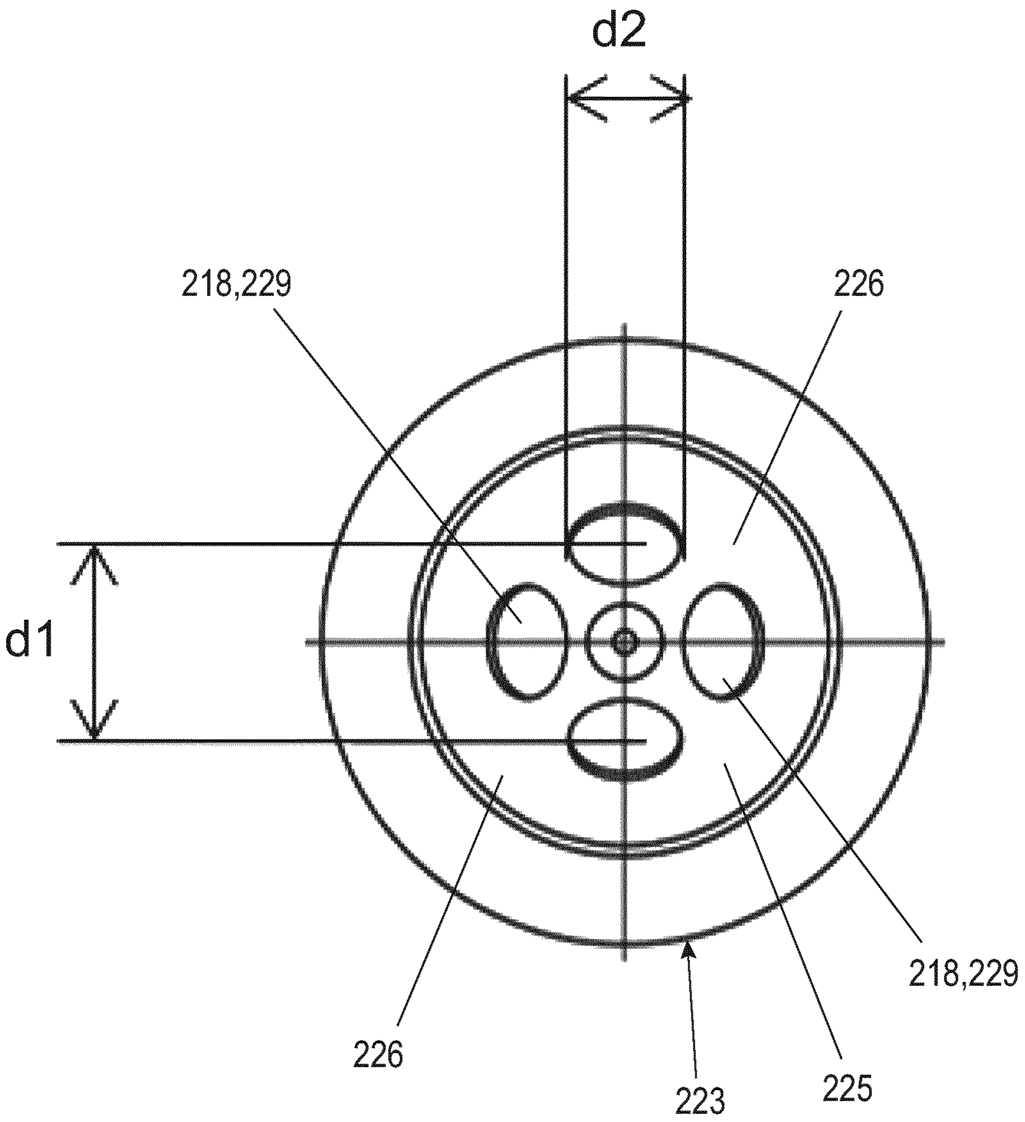
Figure 3A:
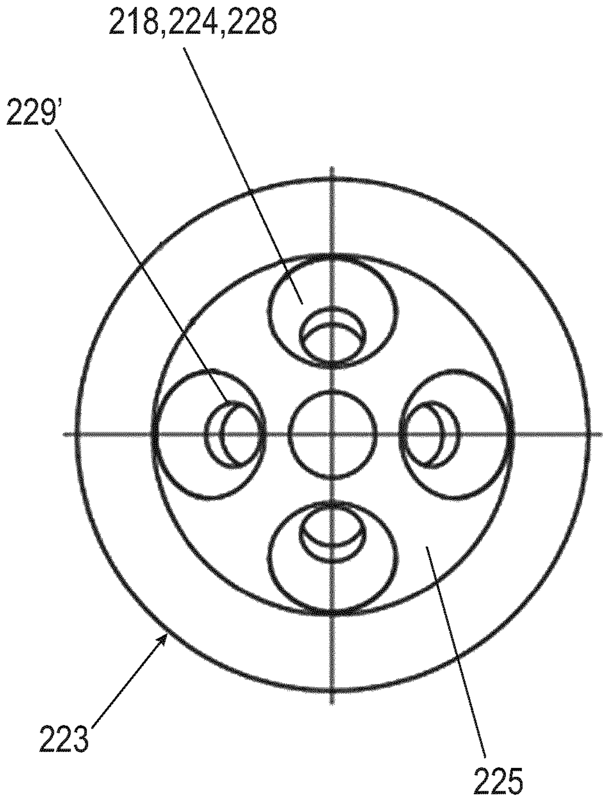
Figure 4:
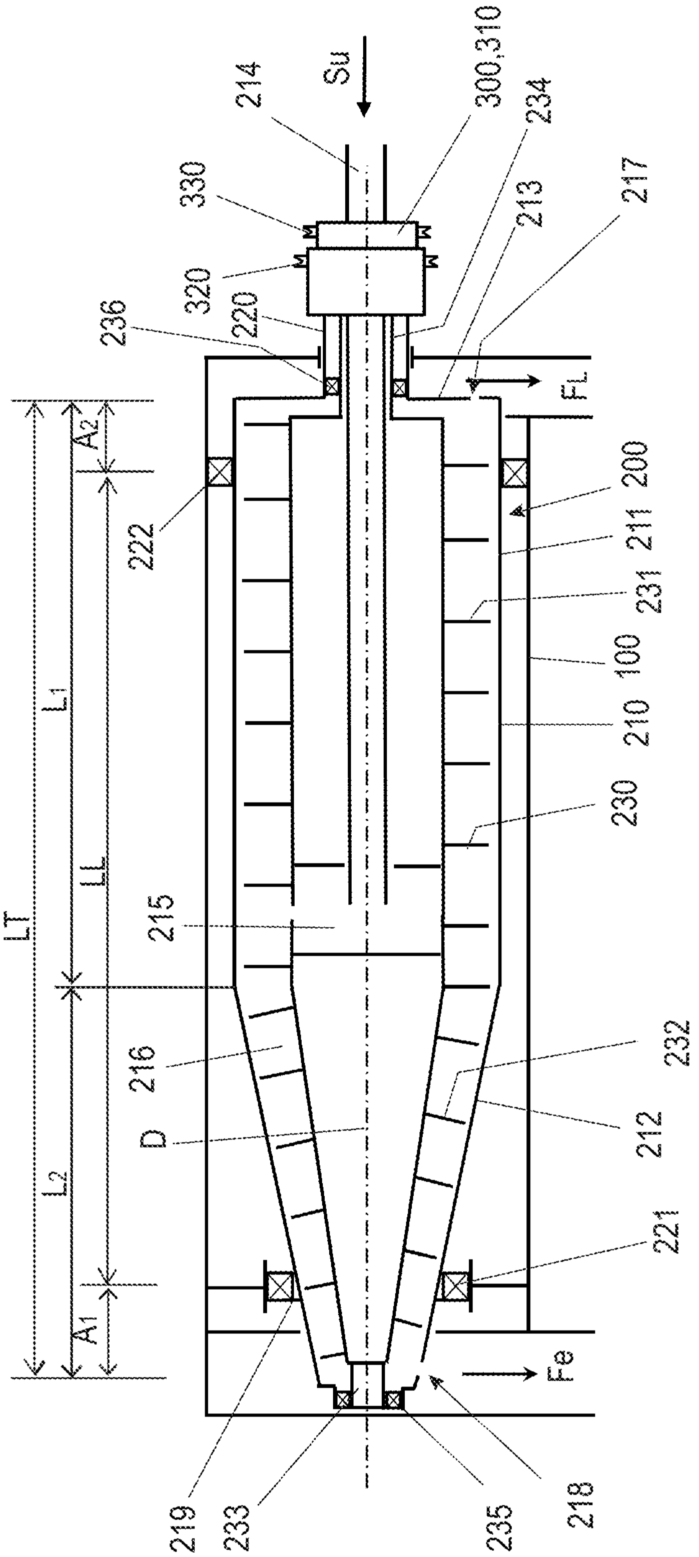
Fig. 4 Prior Art

In the following, the invention is described in more detail with reference to the drawing by means of exemplary embodiments. Features described in connection with these exemplary embodiments can also be used in other exemplary embodiments (not shown) of the invention and can therefore also be used as features for claims, wherein:

FIG. 1: shows a schematic view in section of a solid-bowl screw centrifuge according to the invention;

FIG. 2: shows in a) a view of the solid-discharge drum cover of a first embodiment of the drum of the solid-bowl screw centrifuge of FIG. 1, in b) a sectional view of the cutaway enlargement of the solid-discharge drum cover of FIG. 2*a* and the conical portion of the drum;

FIG. 3: shows in a) a view of a solid-discharge drum cover of a further embodiment variant of the drum of the solid-bowl screw centrifuge of FIG. 1, in b) a sectional view of the cutaway enlargement of the solid-discharge drum cover of FIG. 3*a* and the conical portion of the drum;

FIG. 4: shows a schematic view in section of a prior art solid-bowl screw centrifuge.

DETAILED DESCRIPTION

Initially, the construction of FIG. 4 is described, which is further developed in FIG. 1 according to the invention.

FIG. 4 shows a solid-bowl screw centrifuge having a frame 100—which can preferably be designed as a type of housing—that is not rotatable or does not rotate during operation, and a rotor 200 that is rotatable or rotates during operation.

The rotor 200 has a rotatable drum 210 with a horizontal axis of rotation D. However, the axis of rotation D can also be oriented differently in space, in particular vertically. The rotor 200 also includes a screw 230 arranged in the drum 210, the axis of rotation of which coincides with the axis of rotation of the drum 210.

The drum 210 has a cylindrical portion 211 with a length $L_1$ and an axially adjoining conical portion 212 with a length $L_2$. The cylindrical portion 211 is terminated here by a substantially radially extending drum cover 213. In the conical portion 212 with length $L_2$, the drum is preferably conical on the inside and outside (relative to the drum shell).

Here, the screw 230 also has a cylindrical portion 231 and an axially adjoining conical portion 232, and is arranged within the drum 210. In operation, the screw 230 can be rotated at a differential speed to the drum 210.

A feed pipe 214 extends into the drum 210, here concentrically to the axis of rotation, and opens into a distributor 215 through which a suspension Su to be processed can be fed here radially into a centrifugal chamber 216 of the drum 210. The feed pipe 214 can either be led into the drum 210 from the side of the cylindrical drum portion 211, or it can be led into the drum 210 from the side of the conical drum portion 212.

One or more liquid outlets 217 may be formed in or on the drum cover 213. These may be formed in various ways, such as openings in the drum cover 213 having a type of overflow weir, or in other ways, such as a peeling disc.

At least one solids discharge 218 is formed at the end of the conical portion 212.

The drum 210 is designed as a solid-bowl drum. At least one liquid phase Fl is clarified from solid matter Fe in the rotating drum 210. The at least one liquid phase Fl exits the liquid outlet 217 at the drum cover 213. The solid matter Fe, on the other hand, is transported by the screw 230 in the direction of the solids discharge 218, where they are ejected from the drum 210.

The drum cover 213, or the actual drum 210, may be axially adjoined by a first drum shaft portion 220 that is connected in a rotationally fixed manner to the drum 210, and the conical drum portion 212 may be axially adjoined by a second drum shaft portion 219 that is also connected in a rotationally fixed manner to the drum 210.

Axially adjacent to the cylindrical portion 231 of the screw 230 is a first screw shaft portion 234, which may be connected in a rotationally fixed manner to the screw 230. The conical portion 232 is mounted on a bearing 235. This bearing 235 may be mounted on a second screw shaft portion 233.

A drive device, which may have one or two motors, is used to drive the rotor 200. Downstream of the drive device 300 there may be at least one gear 310, on which two pulleys 320, 330 are schematically shown here, indicating that the gear 310 may have at least two interfaces for feeding a respective torque of the motor or motors into the gear 310 to drive the drum and screw. Alternatively (not shown here), the rotor may be driven in other ways.

According to FIG. 4 (and preferably also according to the variants of the invention), the gear 310 rotates the drum 210 on the one hand and the screw 230 on the other hand. For this purpose, the gear 300 may have two output shafts. The first output shaft may be coupled in a rotationally fixed manner to the first drum shaft portion 220 or directly coupled to the drum 210. The second output shaft, on the other hand, may be directly or indirectly coupled to the first screw shaft portion 234 in a rotationally fixed manner or directly coupled to the screw 230.

The drum 210 can be rotatably mounted with two drum bearings 221, 222 arranged axially offset in the direction of the axis of rotation. The term "bearing" is not to be understood too narrowly in this respect. Each of the bearings 221, 222 may comprise one or more individual bearings, but these are then arranged axially directly adjacent to one another, so that they can each be functionally regarded as a single bearing.

The drum bearings 221, 222 may advantageously be disposed between the drum 210 and the frame 100 or one or more elements connected to the frame so that the drum 210 can be rotated relative to the frame 100. This also applies to all other variations illustrated. Here, the drum bearings 221, 222 are preferably arranged radially between the drum 210 and the frame 100 or one or more element(s) connected to the frame.

In contrast, the screw bearings 235, 236 may be disposed radially between the screw 230 and the drum 210 so that the screw 230 may be rotatable relative to the drum 210.

In one possible embodiment variant (not shown), the one of the screw bearings 235 in the region of the solids discharge 218 may be omitted. This may be provided, for example, in a vertical arrangement of the decanter.

Preferably, according to FIG. 4—as well as also according to FIG. 1 and further variants of the invention—one or even both drum bearings 221, 222 can be arranged within the axial area that lies between the solids discharge 218 and the liquid outlet 217 of the drum 210 or directly adjoins an area of the liquid outlet 217 and/or a solids discharge 218 of the drum 210. The drum bearings 221, 222 are then positioned radially outwardly on the drum 210 or radially or axially outwardly at or on the drum cover 213.

If one of the drum bearings 221, 222 is located within the axial region that lies between the solids discharge 218 and the liquid outlet 217 of the drum 210, the other of these bearings—the other of the drum bearings 221, 222—may be located outside this axial region.

It may be provided that the drum bearings 221, 222 are spaced a distance $L_L$ apart for supporting the drum 210 in the housing 100, wherein the distance $L_L$ between the drum bearings 210 is less than the axial length $L_T$ of the drum.

In a preferred design, the above features can also be present in the solid-bowl screw centrifuge of FIG. 1 and other figures, as well as in other variants of the invention. In this case, however, the solids discharge and preferably also the bearing can be designed in a different way.

The solids discharge 218 may be configured in the prior-art solid-bowl screw centrifuge of FIG. 4 such that the openings of the solids discharge 218 are oriented radially or substantially radially of the drum 210.

In the solid-bowl screw centrifuge of FIGS. 1 and 2 and 3, the solids discharge 218 is preferably configured such that the openings 224 of the solids discharge 218 are aligned axially or substantially in the axial direction of the drum 210. They are also preferably located within the smallest diameter of the conical portion 212 of the drum, relative to the inner shell or inner diameter.

The conical portion of the solid-discharge drum cover can thus either extend at right angles to the axis of rotation or be arranged at an angle of more than 45°, in particular more than 65°. The openings can also be located in a further conical drum portion whose conicity angle to the axis of rotation is greater than 45°, in particular more than 65°.

In operation, solids in the rotating drum are first conveyed from a suspension rotating radially outwardly in the drum into the conical region 212 of the drum 210 and from there are further conveyed or pushed radially inwardly to the solids discharge 218.

For this purpose, a solid-discharge drum cover 223 axially adjoins the conical portion of the drum 210 and axially closes the conical portion 212 of the drum 210. The solid-discharge drum cover 223 may have a conical configuration, either entirely or in sections. In this case, the conicity angle of the conical portion 226 is larger, in particular more than 10° larger, than the conicity angle in the conical portion of the drum. The solids discharge 218 may be configured such or thereby such that the openings 224 of the solids discharge 218 are oriented axially or substantially in the axial direction of the drum 210.

The solid-discharge drum cover 223 may have one or more, for example four, openings 224 forming the solids discharge. These may be formed as window-like circumferentially enclosed openings in the conical portion of the solid-discharge drum cover 223.

In this regard, it may be advantageously provided, according to a variant that is easy to implement in terms of design, that the solids discharge 218 is located downstream of the drum bearing 221 in the conical portion 212 of the drum 210 in the axial direction with respect to the cylindrical portion 211 of the drum 210. It may also be advantageously provided that the solids discharge 218 is located downstream of the screw bearing 235 in the axial direction with respect to the cylindrical portion 211 of the drum 210.

Figure 2B:
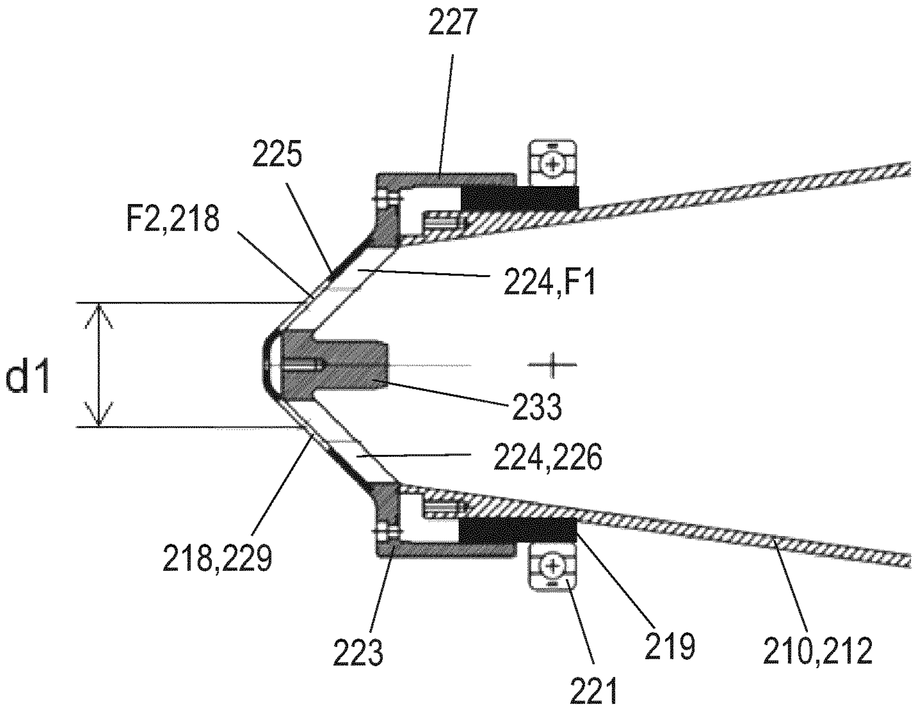

FIG. 2*a* and FIG. 2*b* illustrate an embodiment variant of solids discharge 218 that includes openings 224 oriented in an axial or substantially axial direction.

A cover plate 225 is attached to the solid-discharge drum cover 223 on the inside or preferably on the outside. The cover plate 225 can be exchangeable, in particular exchangeably attached to the remaining drum 210, in particular the solid-discharge drum cover 223. The cover plate 225 may be replaceably attached to the solid-discharge drum cover 223 by fastening means such as screws. The cover plate 225 can have a conical shape.

The solid-discharge drum cover 223 has openings 224 with an area F1. Corresponding openings 229 are formed in the cover plate 225. This means that the openings overlap completely or at least partially and are aligned with each other. These openings 229 may have an area smaller than the area F2. The cover plate 225 configured in this way acts like an aperture.

Thus, the size and/or location of the solids discharge 218 or the size and/or location of its openings 229—when the drum is at a standstill—can be easily changed by replacing the cover plate 225 with the openings 229 with a cover plate having openings 229 of a different area and/or arrangement.

The aperture-like openings 229 are arranged on a pitch circle with a diameter d1 and have an opening diameter d2. Depending on the requirements, both the diameter d1 and the diameter d2 can be changed by replacing the respective cover plate 225. The solid matter Fe thus exits the drum 210 through these aperture-like openings 229 when the cover plate 225 is replaced on a variable diameter in the axial direction of the drum 210.

According to optional further developments, the solid-discharge drum cover 223 may have one or more further advantageous features.

For example, the solid-discharge drum cover 223 may include a conical portion 226 in which the openings 224—in this case, the four openings 224—may be formed. The solid-discharge drum cover 223 may further comprise a cylindrical portion 227 adjoining the conical portion 226, preferably axially toward the cylindrical portion of the drum.

Thus, it may have a cylindrical portion 227 in addition to a conical portion 226. In this regard, according to an advantageous further development, it can then be fixed to the drum shaft portion 219 with the cylindrical portion 227, and preferably be arranged axially next to the drum bearing 221.

The tapered portion 226 may be internally adjoined by an axial journal, which may be inserted into the screw shaft portion 233 or may even serve as the screw shaft portion 233 in a simple and surprisingly compact and practical design.

Figure 3B:
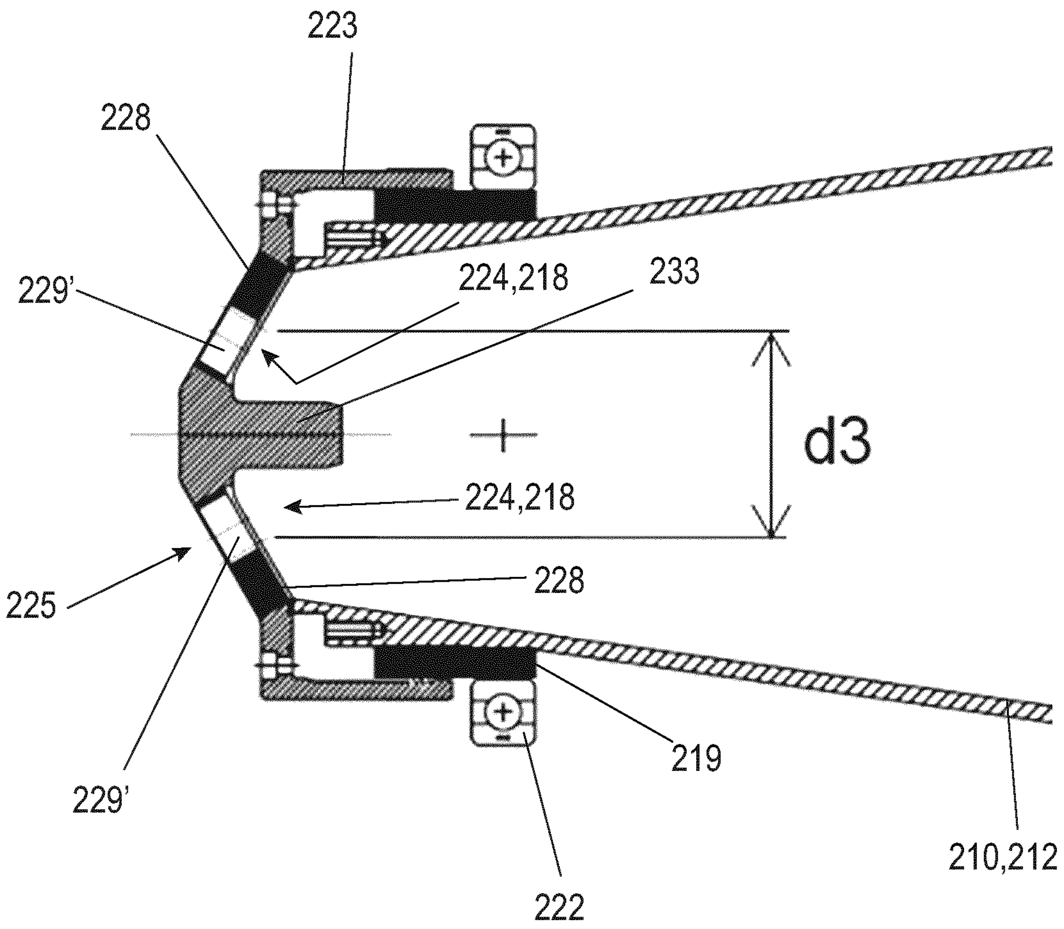

In another embodiment variant of the solids discharge 218 according to FIG. 3*a* and FIG. 3*b*, several openings 224 are again formed in the solid-discharge drum cover 223. Thereby, a sleeve, aperture, or disc 228 may be rotatably mounted in one or more, in particular each of the openings. The outer diameter of the sleeves 228 thus preferably corresponds to the inner diameter of the preferably circular openings 224. The sleeves 228 are preferably rotatably arranged in the openings 224. Thereby, this rotational position can be fixed by fixing means not shown. Preferably, each sleeve or aperture or disc 228 has an opening 229' which can be arranged/formed/aligned eccentrically in the preferably circular sleeve or disc 228. By rotating the respective sleeve 228 about its center point, which may lie on a diameter d3, the diameter on which the center point of the respective opening 229' lies can be changed. The solid matter Fe thus exits the drum 210 through the respective opening 229' in the respective sleeve 228 at a variable diameter in the axial direction of the drum 210.

The solid-discharge drum cover 223 may otherwise be configured like the solid-discharge drum cover of FIG. 2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS

100 Housing
200 Rotor
210 Drum
211 Cylindrical portion
212 Conical portion
213 Drum cover
214 Feed pipe
215 Distributor
216 Centrifugal chamber
217 Liquid outlet
218 Solids discharge
219 Drum shaft portion
220 Drum shaft portion
221 Drum bearing
222 Drum bearing
223 Solid-discharge drum cover
224 Opening
225 Cover plate
226 Conical portion
227 Cylindrical portion
228 Sleeve
229, 229' Opening
230 Screw
231 Cylindrical portion
232 Conical portion
233 Screw shaft portion
234 Screw shaft portion
235 Screw bearing
236 Screw bearing
230 Drive device
310 Gear
320 Pulley
330 Pulley
$A_1$ Distance
$A_2$ Distance
D Axis of rotation
$L_1$ Length
$L_2$ Length
$L_L$ Distance of drum bearing
$L_T$ Length of drum
Su Suspension
Fe Solids
Fl Liquid phase
F1 Area
F2 Area
d1 Diameter of pitch circle
d2 Opening diameter
d3 Diameter

The invention claimed is:

1. A solid-bowl screw centrifuge, comprising:
a housing;
a rotor rotatably mounted in the housing;
a rotatable drum having an axis of rotation, wherein the rotatable drum has a cylindrical portion and a conical portion;
at least one liquid outlet arranged in the cylindrical portion of the rotatable drum;
at least one solids discharge arranged in the conical portion of the rotatable drum;
a screw rotatable relative to the rotatable drum at a differential speed and arranged within the rotatable drum, wherein the rotatable drum and screw together form the rotor;
at least two drum bearings configured to mount the rotatable drum in the housing; and
at least a first screw bearing configured to mount the screw in the rotatable drum,
wherein the rotatable drum is configured in a region of the conical portion or a drying zone such that solid matter is transported by the screw up to a solid-discharge drum cover, which forms a termination of the conical portion in an axial direction of the rotatable drum, in order to leave the rotatable drum through a plurality of axially aligned openings, which are axially aligned with each other, in the solid-discharge drum cover, wherein the plurality of axially aligned openings in the solid-discharge drum cover are located entirely within a smallest inner diameter of the conical portion of the rotatable drum, wherein solid-discharge drum cover has a conical portion and the plurality of axially aligned openings are arranged on the conical portion of the solid-discharge drum cover, and wherein the solid-bowl screw centrifuge further comprises a cover plate with openings corresponding to the plurality of axially aligned openings of the solid-discharge drum cover is fitted to the conical portion of the solid-discharge drum cover.

2. The solid-bowl screw centrifuge of claim 1, wherein the solid-discharge drum cover has a cylindrical portion.

3. The solid-bowl screw centrifuge of claim 1, wherein the plurality of axially aligned openings for solids discharge are formed in the conical portion of the solid-discharge drum cover.

4. The solid-bowl screw centrifuge of claim 1, wherein the conical portion of the solid-discharge drum cover has a cone angle that is greater than an interior cone angle of the conical portion of the rotatable drum.

5. The solid-bowl screw centrifuge of claim 1, wherein the conical portion of the solid-discharge drum cover has a cone angle of more than 60° to an axis of rotation of the rotatable drum.

6. The solid-bowl screw centrifuge of claim 1, wherein the plurality of axially aligned openings are arranged on a pitch circle with a diameter that is smaller than the smallest inner diameter of the conical portion of the rotatable drum.

7. The solid-bowl screw centrifuge of claim 1, wherein the cover plate is configured to be exchangeable.

8. The solid-bowl screw centrifuge of claim 1, wherein the plurality of axially aligned openings in the solid-discharge drum cover have a larger diameter than the openings of the cover plate.

9. The solid-bowl screw centrifuge of claim 1, wherein a screw shaft is formed in or coupled to the conical portion of the solid-discharge drum cover.

10. The solid-bowl screw centrifuge of claim 1, wherein the openings of the cover plate are arranged circularly on a pitch circle with a first diameter d1 and have an opening diameter d2, so that both the diameter d1 and the diameter d2 is changeable by replacing the respective cover plate.

11. The solid-bowl screw centrifuge of claim 10, wherein a screw shaft portion formed in or coupled to the conical portion of the solid-discharge drum cover.

12. The solid-bowl screw centrifuge of claim 1, wherein the cylindrical portion of the solid-discharge drum cover is fitted to a drum shaft portion.

13. The solid-bowl screw centrifuge of claim 1, further comprising:

a rotatable sleeve rotatably mounted in each of the plurality of axially aligned openings.

14. The solid-bowl screw centrifuge of claim 13, wherein each rotatable sleeve has an opening is arranged eccentrically in the rotatably sleeve, and wherein, by rotating the respective sleeve about its center point, which lies on a diameter d3, a diameter on which the center point of the respective opening lies is changeable.

15. The solid-bowl screw centrifuge of claim 1, wherein the cylindrical portion of the rotatable drum has a length L1, the conical portion of the rotatable drum has a length $L_2$, a sum of $L_1$ and $L_2$ is length $L_T$ of the drum.

16. The solid-bowl screw centrifuge of claim 15, wherein the at least two drum bearings are spaced apart by a distance $L_L$, wherein the distance $L_L$ of the at least two drum bearings from one another is smaller than the length $L_T$ of the drum.

17. The solid-bowl screw centrifuge of claim 1, wherein the at least one solids discharge is located axially outside the at least two drum bearings of rotatable drum.

* * * * *